US011074377B2

United States Patent
Shetty et al.

(10) Patent No.: US 11,074,377 B2
(45) Date of Patent: Jul. 27, 2021

(54) SIMULATORS AND SIMULATION METHODS USING ADAPTIVE DOMAINS

(71) Applicant: Halliburton Energy Services, Inc., Houston, TX (US)

(72) Inventors: Dinesh Ananda Shetty, Sugarland, TX (US); Avi Lin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 552 days.

(21) Appl. No.: 15/744,982

(22) PCT Filed: Sep. 8, 2015

(86) PCT No.: PCT/US2015/048919
§ 371 (c)(1),
(2) Date: Jan. 15, 2018

(87) PCT Pub. No.: WO2017/044073
PCT Pub. Date: Mar. 16, 2017

(65) Prior Publication Data
US 2018/0210980 A1 Jul. 26, 2018

(51) Int. Cl.
*G06F 30/20* (2020.01)
*G05B 17/02* (2006.01)
(Continued)

(52) U.S. Cl.
CPC .............. *G06F 30/20* (2020.01); *E21B 49/00* (2013.01); *G05B 17/02* (2013.01); *G06F 30/00* (2020.01);
(Continued)

(58) Field of Classification Search
CPC ...... G06F 30/20; G06F 30/00; G06F 2111/10; G05B 17/02; G01V 99/005; E21B 49/00
(Continued)

(56) References Cited

U.S. PATENT DOCUMENTS

2005/0171751 A1* 8/2005 Siebrits ................... E21B 43/26
703/10
2006/0036418 A1 2/2006 Pita et al.
(Continued)

FOREIGN PATENT DOCUMENTS

WO 2017044073 A1 3/2017

OTHER PUBLICATIONS

Durlofsky_2004 (Advanced Techniques for Reservoir Simulation and Modeling of Nonconventional Wells, Final Report Department of Petroleum Engineering Stanford University Aug. 20, 2004) (Year: 2004).*

(Continued)

*Primary Examiner* — Brian S Cook
(74) *Attorney, Agent, or Firm* — John W. Wustenberg; Parker Justiss, P.C.

(57) ABSTRACT

An illustrative domain-adaptive simulator includes: a data acquisition module, a simulator module, and a visualization module. The data acquisition module acquires measurements of a physical system. The simulator module provides a series of states for the physical system, the series including at least a current state and a subsequent state, wherein as part of said providing, the simulator module implements a method that includes: (a) constructing a modeled domain for the system; (b) determining a domain of influence within the modeled domain; (c) generating a linear set of equations to derive the subsequent state from the current state, the linear set of equations excluding a region of the modeled domain outside the domain of influence; and (d) deriving the subsequent state from the linear set of equations. The visualization module displays the series of states.

20 Claims, 5 Drawing Sheets

(51) Int. Cl.
  *E21B 49/00* (2006.01)
  *G06F 30/00* (2020.01)
  *G01V 99/00* (2009.01)
  *G06F 111/10* (2020.01)

(52) U.S. Cl.
  CPC ......... *G01V 99/005* (2013.01); *G06F 2111/10* (2020.01)

(58) Field of Classification Search
  USPC .......................................................... 703/10
  See application file for complete search history.

(56) References Cited

U.S. PATENT DOCUMENTS

| | | |
|---|---|---|
| 2012/0296619 A1 | 11/2012 | Maliassov et al. |
| 2013/0090907 A1 | 4/2013 | Maliassov |
| 2013/0246030 A1* | 9/2013 | Usadi ..................... G06F 30/20 703/10 |

OTHER PUBLICATIONS

Yamaleev_1999 (Minimization of the Truncation Error by Grid Adaptation, NASA/CR-1999-209729 ICASE Report No. 99-46). (Year: 1999).*

Mohamad-Saleh_2008 (Improved Neural Network Performance Using Principal Component Analysis on Matlab, International Journal of The Computer, the Internet and Management vol. 16. No. 2 (May-Aug. 2008) pp. 1-8). (Year: 2008).*

Eshiet_2012 (Modeling of Hydraulic Fracturing and Its Engineering Application, University of Leeds, 2012) (Year: 2012).*

Kronbichler_2012 (High Accuracy Mantle Convection Simulation through Modern Numerical Methods, Geophysical Journal International, 2012 191, 12-29) (Year: 2012).*

* cited by examiner

SIMULATORS AND SIMULATION METHODS USING ADAPTIVE DOMAINS

CROSS-REFERENCE TO RELATED APPLICATION

This application is the National Stage of, and therefore claims the benefit of, International Application No. PCT/US2015/048919 filed on Sep. 8, 2015, entitled "SIMULATORS AND SIMULATION METHODS USING ADAPTIVE DOMAINS," which was published in English under International Publication Number WO 2017/044073 on Mar. 16, 2017. The above application is commonly assigned with this National Stage application and is incorporated herein by reference in its entirety.

BACKGROUND

Various facets of oilfield exploration and development require that the behavior of complex systems be accurately represented as a prerequisite to efficient exploitation of hydrocarbon reserves. As one example, the preferred technology for stimulating unconventional reservoirs involves the injection of fluids and proppants at high pressures and flow rates to create and open a network of fractures in the formation around a wellbore, and without an accurate representation of this system's behavior, realistic planning and control of the stimulation process cannot be achieved. As no closed-form solutions are available for predicting the behavior of this and other illustrative complex systems, it becomes necessary to employ numerical modeling and computer simulation. As with other complex system simulators, many existing fracturing operation simulators are unable to provide sufficiently accurate representations of the system behavior in a timeframe that would be of use to their operators.

BRIEF DESCRIPTION OF THE DRAWINGS

Accordingly, the drawings and the following description disclose simulators and simulation methods employing adaptive domains to expedite modeling of complex system behavior. In the drawings.

Figure 1:
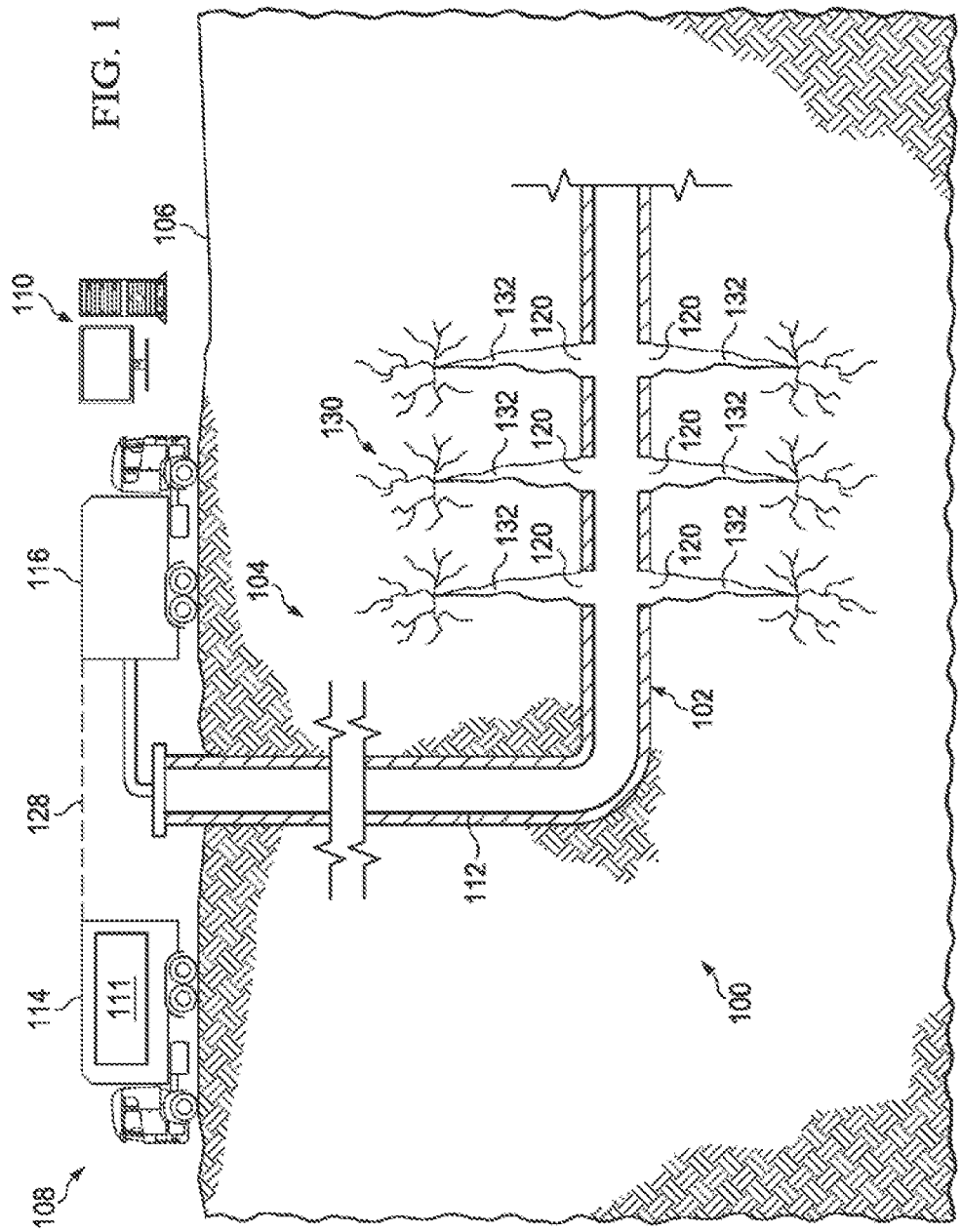
FIG. 1 is an environmental view of an illustrative complex system.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The disclosed simulators and simulation methods are best understood in an illustrative context. We begin here with a brief discussion of an illustrative hydraulic fracturing operation, an area of particular applicability of the present disclosure. FIG. 1 shows the environment 100 of an illustrative hydraulic fracturing operation together with a symbolic computing subsystem 110. A wellbore 102 extends into a subterranean region 104 beneath the ground surface 106. Typically, the subterranean region includes a reservoir that contains hydrocarbon resources such as oil, natural gas, or others. For example, the subterranean region 104 may include all or part of a rock formation (e.g., shale, coal, sandstone, granite, or others) that contains natural gas. The subterranean region 104 may include naturally fractured rock or natural rock formations that are not fractured to any significant degree. When the subterranean region 104 includes tight gas formations (i.e., natural gas trapped in low permeability rock such as shale), it is typically desirable to increase the degree of fracturing in the formation to increase the formation's effective permeability.

Accordingly, FIG. 1 also shows an injection assembly 108 coupled to a conduit 112 in the wellbore. The injection assembly 108 includes instrument trucks 114 and pump trucks 116 that operate to inject fluid via the conduit 112 into the subterranean region 104, thereby opening existing fractures and creating new fractures. The fluid reaches the formation via one or more fluid injection locations 120, which in many cases are perforations in the conduit 112. The conduit 112 may include casing cemented to the wall of the wellbore 102, though this is not a requirement. In some implementations, all or a portion of the wellbore 102 may be left open, without casing. The conduit 112 may include a working string, coiled tubing, sectioned pipe, or other types of conduit.

The fracture treatment may employ a single injection of fluid to one or more fluid injection locations, or it may employ multiple such injections, optionally with different fluids. Where multiple fluid injection locations are employed, they can be stimulated concurrently or in stages. Moreover, they need not be located within the same wellbore, but may for example be distributed across multiple wells or multiple laterals within a well. An injection treatment control subsystem 111 coordinates operation of the injection assembly components to monitor and control the fracture treatment. It may rely on computing subsystem 110, which represents the various data acquisition and processing subsystems optionally distributed throughout the injection assembly 108 and wellbore 102, as well as any remotely-coupled offsite computing facilities available to the injection treatment control subsystem 111. Though the computing subsystem is described below as implementing the simulator as a separate entity, some contemplated embodiments of the injection treatment control subsystem 111 have the simulator as an integrated component.

The pump trucks 116 can include mobile vehicles, immobile installations, skids, hoses, tubes, fluid tanks, fluid reservoirs, pumps, valves, mixers, or other types of structures and equipment. They can supply treatment fluid and other materials (e.g., proppants, stop-loss materials) for the injection treatment. The illustrated pump trucks 116 communicate treatment fluids into the wellbore 102 at or near the level of the ground surface 106. The pump trucks 116 are coupled to valves and pump controls for starting, monitoring, stopping, increasing, decreasing or otherwise controlling pumping as well as controls for selecting or otherwise controlling fluids pumped during the injection treatment.

The instrument trucks 114 can include mobile vehicles, immobile installations, or other suitable structures and sensors for measuring temperatures, pressures, flow rates, and other treatment and production parameters. The example instrument trucks 114 shown in FIG. 1 include an injection treatment control subsystem 111 that controls or monitors the injection treatment applied by the injection assembly 108. The injection assembly 108 may inject fluid into the formation above, at, or below a fracture initiation pressure; above, at, or below a fracture closure pressure; or at another fluid pressure.

Communication links 128 enable the instrument trucks 114 to communicate with the pump trucks 116, and other equipment at the ground surface 106. Additional communication links enable the instrument trucks 114 to communicate with sensors or data collection apparatus in the wellbore 102, other wellbores, remote facilities, and other devices and equipment. The communication links can include wired or wireless communications assemblies, or a combination thereof.

The injection treatment control subsystem 111 may include data processing equipment, communication equipment, or other assemblies that control injection treatments applied to the subterranean region 104 through the wellbore 102. The injection treatment control subsystem 111 may be communicably linked to the computing subsystem 110 that can calculate, select, or optimize treatment parameters for initiating, opening, and propagating fractures in the subterranean region 104. The injection treatment control subsystem 111 may receive, generate or modify an injection treatment plan (e.g., a pumping schedule) that specifies properties of an injection treatment to be applied to the subterranean region 104. Based on such modeled behavior results, the injection treatment control subsystem 111 shown in FIG. 1 controls operation of the injection assembly 108.

FIG. 1 shows that an injection treatment has fractured the subterranean region 104. FIG. 1 shows examples of dominant fractures 132 extending into natural fracture networks 130, the dominant fractures having been formed and opened by fluid injection through perforations 120 along the wellbore 102. Generally, induced fractures may extend through naturally fractured rock, regions of un-fractured rock, or both. The injected fracturing fluid can flow from the dominant fractures 132, into the rock matrix, into the natural fracture networks 130, or in other locations in the subterranean region 104. The injected fracturing fluid can, in some instances, dilate or propagate the natural fractures or other pre-existing fractures in the rock formation.

In some implementations, the computing subsystem 110 simulates fluid flow along the wellbore 102, through the perforations, through the fracture network, and into the formation (and in the other direction as well). The flow models can model the flow of incompressible fluids (e.g., liquids), compressible fluids (e.g., gases), or a combination of multiple fluid phases with or without entrained solids. In some instances, the flow models can model flow in one, two, or three spatial dimensions. The flow models can include nonlinear systems of differential or partial differential equations. The computing subsystem 110 can use the flow models to predict, describe, or otherwise simulate and analyze the dynamic behavior of fluid in the well and surrounding region. As part of such simulation, the computing subsystem 110 may iteratively, generate, discretize, and solve the governing flow equations.

It should be noted that the induced hydraulic fractures can interact with each other and with the existing natural fractures, thus generating a complex fracture network structure, resulting in a model having a complex network connection graph, which may change its configuration and spatial dimensions as a function of time. These physical characteristics of the fracture network make its computational simulation computationally complex in space and time. The computing subsystem 110 can perform simulations before, during, or after the injection treatment. In some implementations, the injection treatment control subsystem 111 controls the injection treatment based on simulations performed by the computing subsystem 110. For example, a pumping schedule or other aspects of a fracture treatment plan can be generated in advance based on simulations performed by the computing subsystem 110. As another example, the injection treatment control subsystem 111 can modify, update, or generate a fracture treatment plan based on simulations performed by the computing subsystem 110 in real time during the injection treatment. Thus it becomes imperative to employ highly adaptive computational and simulation algorithms that deliver high fidelity results with minimal computation resource consumption.

In some cases, the simulations are based on logging, completion, and production data obtained from well and surrounding region, as well as real-time observations. For example, real-time observations may be obtained from pressure meters, flow monitors, microseismic equipment, tiltmeters, or such equipment. Such measurements improve the accuracy with which the computing subsystem 110 can simulate fluid flow. In some cases, the injection treatment control subsystem 111 can select or modify (e.g., increase or decrease) fluid pressures, fluid densities, fluid compositions, and other control parameters based on data provided by the simulations. In some instances, data provided by the simulations can be displayed in real time during the injection treatment, for example, to an engineer or other operator of the injection assembly 108.

Some of the techniques and operations described herein may be implemented by a one or more computing assemblies configured to provide the functionality described. In various instances, a computing assembly may include any of various types of devices, including, but not limited to, handheld mobile devices, tablets, notebooks, laptops, desktop computers, workstations, mainframes, distributed computing networks, and virtual (cloud) computing systems.

Figure 2:
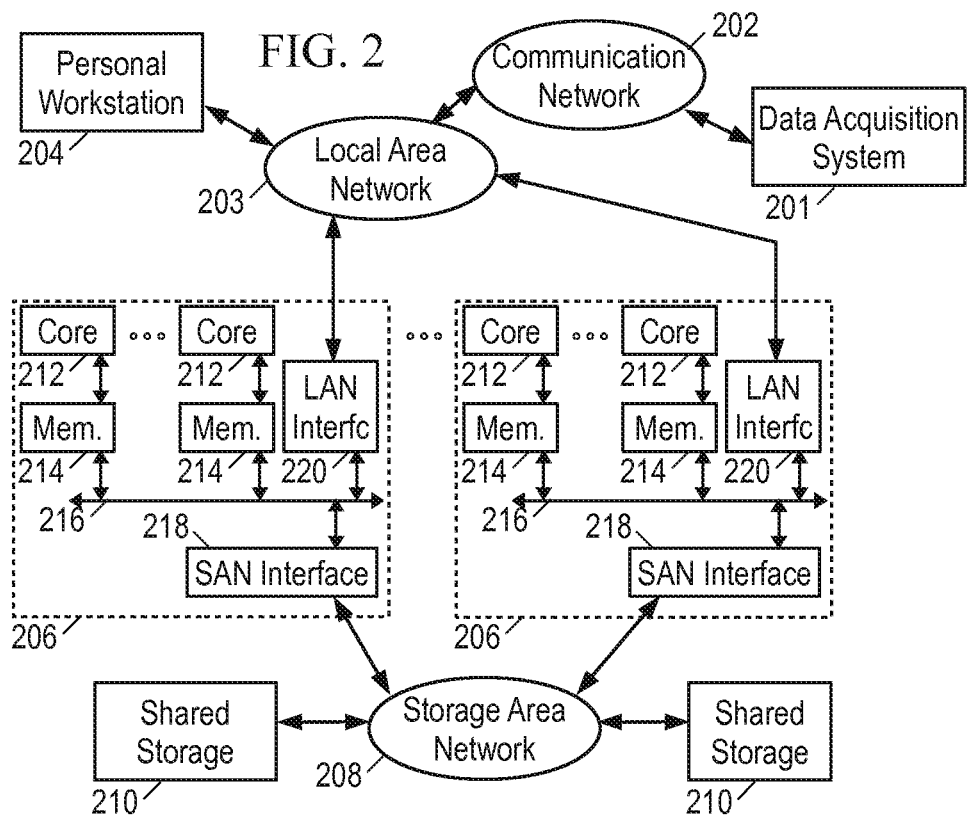
FIG. 2 is a block diagram of an illustrative simulator.

FIG. 2 shows an illustrative computing subsystem 110 in which a data acquisition system 201 represents the instrument trucks 114 and other sources of data regarding the well and surrounding formations. A communications network 202 (such as, e.g., the internet or other communications link for transferring digital data) couples the data acquisition system 201 to a local area network (LAN) 203 to communicate the data to a personal workstation 204. The data can include treatment data, geological data, fracture data, fluid data, or other types of data. Workstation 204 may take the form of a desktop computer having a user interface (e.g., keyboard, mouse, and display) that enables the user to interact with the other elements of the computing subsystem, e.g., by entering commands and viewing responses. In this fashion, the user is able to retrieve the well data and make it available for simulation of flow in a network of fractures.

Workstation 204 may lack sufficient internal resources to perform such processing in a timely fashion. The LAN 203 further couples the workstation 204 to one or more multi-processor computers 206, which are in turn coupled via a storage area network (SAN) 208 to one or more shared storage units 210. LAN 204 provides high-speed communication between multi-processor computers 206 and with personal workstation 204. The LAN 204 may take the form of an Ethernet network.

Multi-processor computer(s) 206 provide parallel processing capability to enable suitably prompt processing of the fracture flow model data. Each computer 206 includes multiple processors 212, distributed memory 214, an internal bus 216, a SAN interface 218, and a LAN interface 220. Each processor 212 operates on allocated tasks to solve a portion of the overall problem and contribute to at least a portion of the overall results. Associated with each processor 212 is a distributed memory module 214 that stores application software and a working data set for the processor's use. Internal bus 216 provides inter-processor communication and communication to the SAN or LAN networks via the corresponding interfaces 218, 220. Communication between processors in different computers 206 can be provided by LAN 204 or via a mailbox mechanism on storage devices 210.

SAN 208 provides low-latency access to shared storage devices 210. The SAN 208 may take the form of, e.g., a Fibrechannel or Infiniband network. Shared storage units 210 may be large, stand-alone information storage units that employ magnetic disk media for nonvolatile data storage. Other suitable forms of nontransitory information storage media can also be employed. To improve data access speed and reliability, the shared storage units 210 may be configured as a redundant disk array ("RAID").

It is the software that configures the various parts of the computing subsystem 110 to coordinate and collectively operate as a complex system simulator. One or more commercially available software packages and libraries may be installed in the computer assembly to provide the functionality for solving linear systems. User-authored programs, functions, scripts, workflows, or other programming mechanisms may be employed to customize the operation of the software and automate certain operations such as those outlined below for simulating fracturing treatments and fluid flows. The applications software may include a fluid flow simulation module, a hydraulic fracture simulation module, a reservoir simulation module, a user interface module, and other simulator modules, each implemented in the form of machine-readable instructions. Examples of commercially available software that support the use of such programming include C, C++, C++ AMP, D, Erlang, and Fortran. The computing subsystem 110 can be preprogrammed or it can be programmed (and reprogrammed) by loading a program from another source (e.g., from a CD-ROM, from another computer device through a data network, or in another manner). Nevertheless, the implementation of the following methods is not limited to any specific software language or execution environment.

Figure 3:
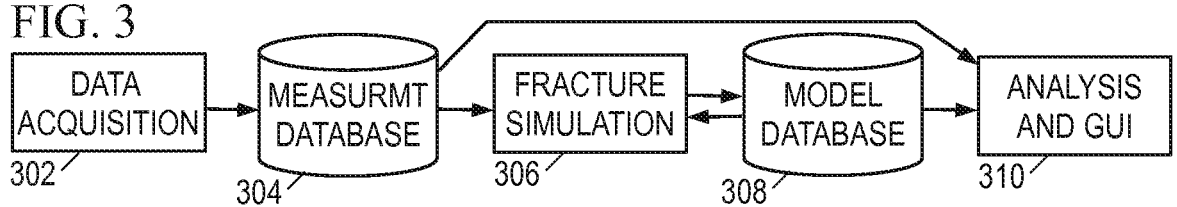
FIG. 3 is a diagram of an illustrative simulator software architecture.

The software operating on the computing subsystem 110 may be structured as indicated by the software architecture shown in FIG. 3. A data acquisition module 302 stores various types of data in a measurement database 304. The measurement database may include treatment data relating to injection treatment plans. For example the treatment data can indicate a pumping schedule, parameters of a previous injection treatment, parameters of a future injection treatment, or parameters of a proposed injection treatment. Such parameters may include information on flow rates, flow volumes, slurry concentrations, fluid compositions, injection locations, injection times, or other parameters.

The measurement database may further include geological data relating to geological properties of a subterranean region. For example, the geological data may include information on wellbores, completions, or information on other attributes of the subterranean region. In some cases, the geological data includes information on the lithology, fluid content, stress profile (e.g., stress anisotropy, maximum and minimum horizontal stresses), pressure profile, spatial extent, or other attributes of one or more rock formations in the subterranean zone. The geological data can include information collected from well logs, rock samples, outcroppings, microseismic imaging, or other data sources.

The measurement database may still further include fracture data relating to fractures in the subterranean region. The fracture data may identify the locations, sizes, shapes, and other properties of fractures in a model of a subterranean zone. The fracture data can include information on natural fractures, hydraulically-induced fractures, or any other type of discontinuity in the subterranean region. The fracture data can include fracture planes calculated from microseismic data or other information. For each fracture plane, the fracture data can include information (e.g., strike angle, dip angle, etc.) identifying an orientation of the fracture, information identifying a shape (e.g., curvature, aperture, etc.) of the fracture, information identifying boundaries of the fracture, or any other suitable information.

The measurement database may yet still further include fluid data relating to well fluids and entrained materials. The fluid data may identify types of fluids, fluid properties, thermodynamic conditions, and other information related to well assembly fluids. The fluid data can include flow models for compressible or incompressible fluid flow. For example, the fluid data can include coefficients for systems of governing equations (e.g., Navier-Stokes equations, advection-diffusion equations, continuity equations, etc.) that represent fluid flow generally or fluid flow under certain types of conditions. In some cases, the governing flow equations define a nonlinear system of equations. The fluid data can include data related to native fluids that naturally reside in a subterranean region, treatment fluids to be injected into the subterranean region, hydraulic fluids that operate well assembly tools, or other fluids that may or may not be related to a well assembly.

The simulator module 306 may employ the information from the measurement database 304 to construct a numerical model of the formation and wellbore system and to determine its behavior by simulation. The numerical model as stored in the model database 308 reflects the state of the system (e.g., the distribution and velocity of fractures, fluids, and related materials) at each of a series of time steps, and, together with the information from the measurement database, serves as the basis for determining subsequent states.

A visualization and analysis module 310 generates visual representations of the model and measurements for an operator, generally in an interactive form that enables the operator to enhance portions of the model and derive analytical results therefrom. The visual representation may depict spatial distributions of values and/or integrated values such as injected volumes, flow rates, fracture dimensions, and estimated permeabilities. In some contemplated embodiments, the analysis module further produces recommendations for real-time modifications to treatment plans that are underway.

Figure 4:
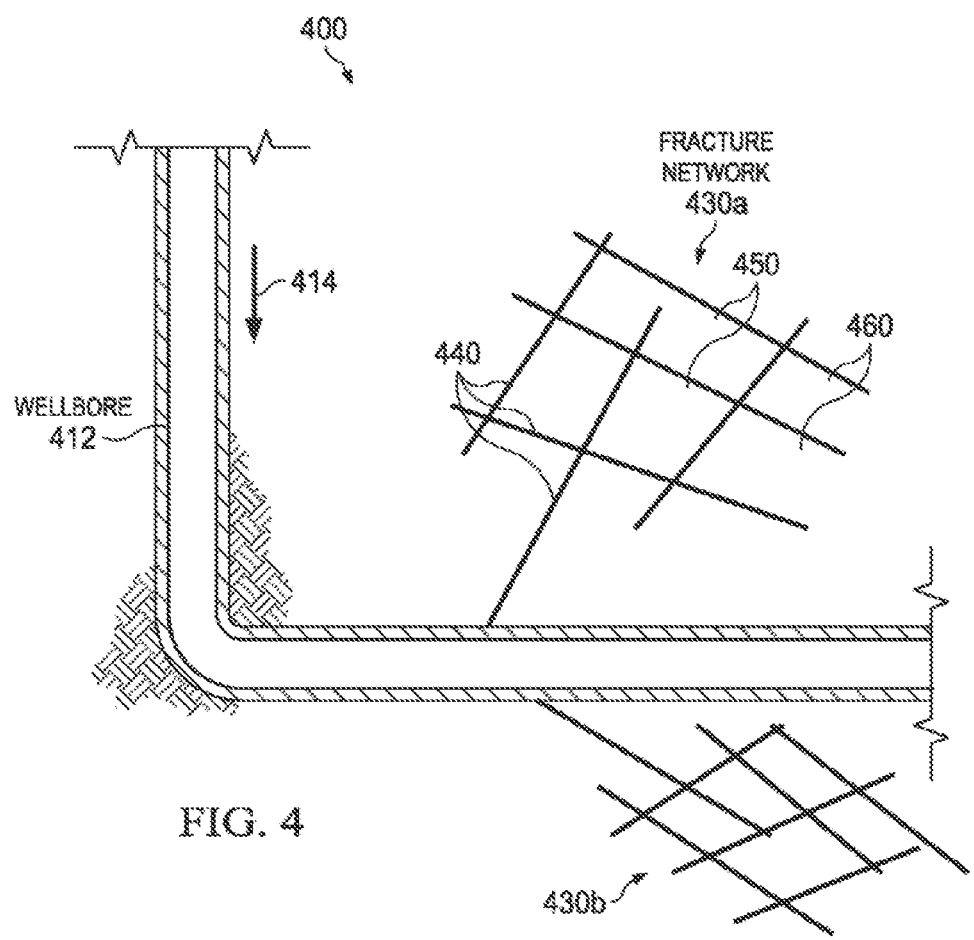
FIG. 4 is an illustrative model of a hydraulic fracturing operation.

During a fluid injection phase of the treatment for a subterranean region 400 (FIG. 4), fluid 414 flows along the wellbore 412 to induce and open hydraulic fractures (e.g., fractures 440) and thereby expand a fracture network (e.g., networks 430*a* and 430*b*). The high pressure fluid exerts forces that deform and shift the rock blocks (e.g., blocks 450) even as new blocks are created (e.g., blocks 460) to expand the network. In some instances, the fractures can range in size from a few meters to hundreds of meters, while the number of fractures can extend to thousands of fractures in one play. The forces produce interactions even between fractures that are not directly connected. Moreover, the induced fractures can interact with the natural fractures, leading to a complex fracture network structure and a general connection graph. To further complicate the situation, the configuration of the fracture network changes as a function of time. Also, the interaction of the fluid with the proppants or other entrained solids also needs to be modeled for accurate simulation results to be achieved. As a consequence, the hydraulic fracturing simulation is a process having a high computational complexity.

Various techniques for reducing this computation complexity are addressed in papers and co-pending applications by the present authors. The novel, adaptive domain technique presented here is of use in this area and in other simulations of systems having many compliant, inertial elements responding to a transient excitation or condition (particularly those systems that can be modeled using hyperbolic and parabolic equations). Illustrative systems include not only fluid flows, heat transfer, and other physical phenomena, but also economic and statistical systems.

Figure 5A:
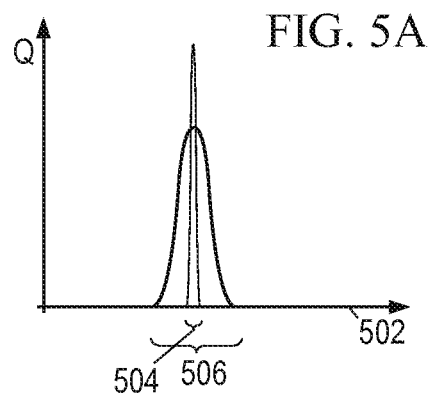
FIGS. 5A-5G show various simulation domains.

FIG. 5A illustrates one example drawn from a heat-transfer system in which a fixed quantity of heat is transferred to the center of a modeled domain 502. The vertical axis in FIG. 5A represents the quantity of interest, in this case the temperature as a function of position. Initially, the heat energy is focused in a small region 504, producing a temperature spike. As time elapses, the temperature increase moderates and spreads out to cover a larger region 506, which is nevertheless much smaller than the modeled domain 502. As no temperature change is observed or expected for the periphery of the domain (at least not until the later stages of the simulation), simulation of this periphery represents an unnecessary expenditure of computational resources.

Figure 5B:
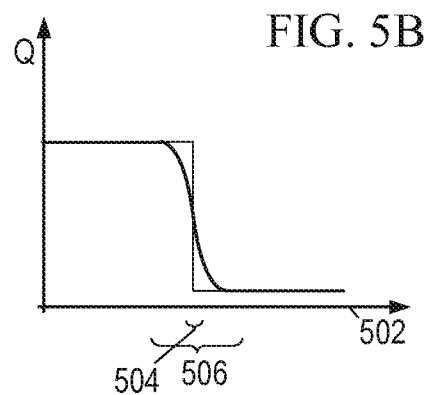
Figure 5C:
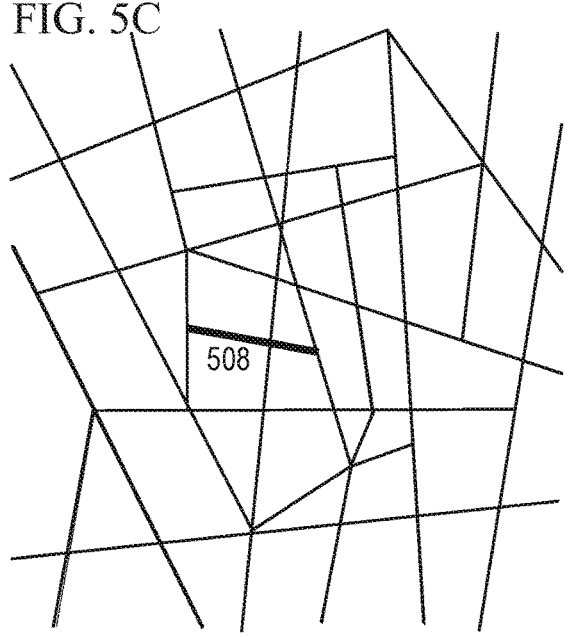
Figure 5D:
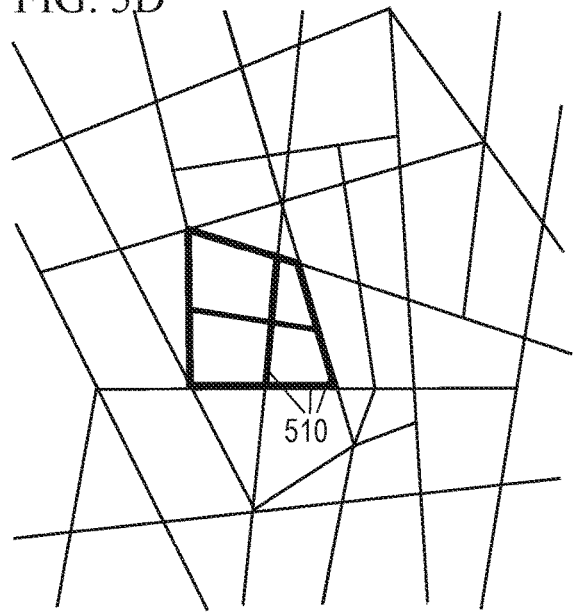
Figure 5E:
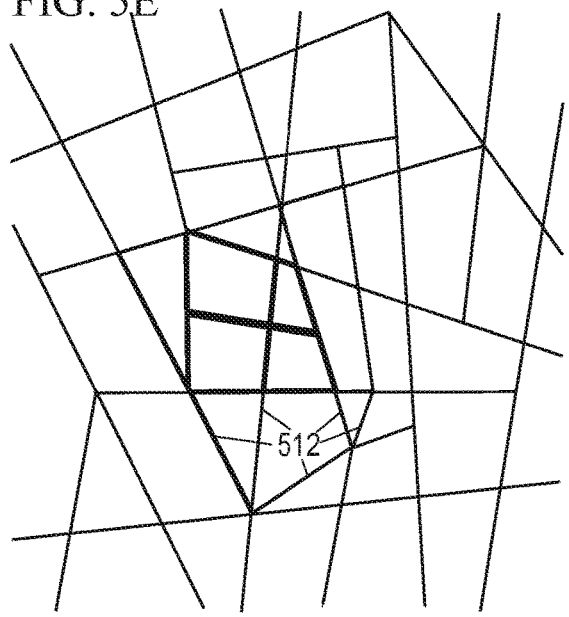
Figure 5F:
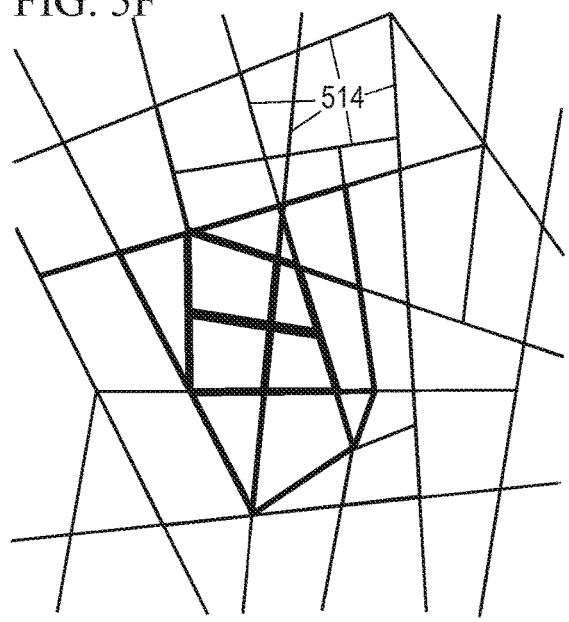

It is not that the quantity around the periphery is zero, but rather that it is not expected to change in the short term, which makes it unnecessary to simulate behavior in that region. FIG. 5B provides an example drawn from a erosion system in which changes are observed to the slope of bank. Initially, the bank is given the form of a step change from one height to another in a small region 504 of the modeled domain 502. Over time, the slope of the bank moderates itself and spreads across a larger region 506, which is nevertheless much smaller than the modeled domain 502. Regions 504 and 506 represent "domains of influence", i.e., regions of the modeled domain where the subsequent state of the system may be expected to change in response to the current state of the system.

FIGS. 5C-5F shows an exemplary fracturing operation progression, illustrating how the injected fluid opens first an initial fracture 508, then a set of secondary fractures 510, a set of tertiary fractures 512, and finally a set of quarternary fractures 514. By the time the final stage of the simulation is reached, it is necessary to consider the whole of the modeled domain, but until then it is sufficient to simulate only a smaller portion thereof, as most of the blocks and fractures experience no activity in the early stages. When simulating time-dependent, multi-phase flows having solid-fluid interactions, the computational resource savings may be substantial.

Figure 5G:
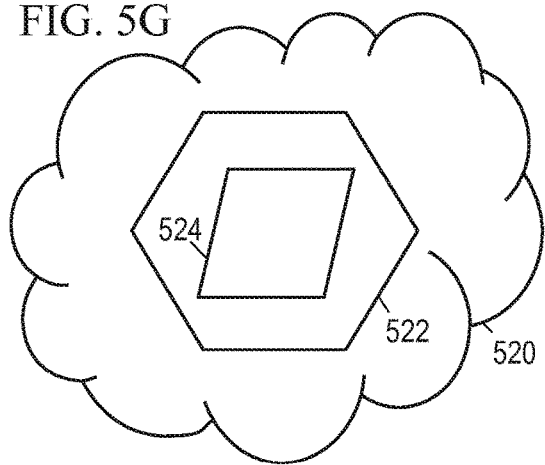

The modeled domain is not necessarily limited to one or two dimensions. In FIG. 5G, the modeled domain 520 represents a multi-dimensional space, which includes a periphery around a smaller domain of influence 522, which may be expected to start small and grow as a function of time. FIG. 5G also shows a second domain of influence 524 embedded within the first. Many simulated systems may have multiple aspects, each aspect having a different domain of influence. For example, a fracture simulator may implement a near-wellbore system of equations for modeling a completely coupled system accounting for solid dynamics, fracture flow, and reservoir flow, and may further implement a far-field system of simplified equations that merely simulate reservoir flow. The latter system may be implemented with a larger domain of influence (522) where the secondary effects can be neglected, and the former with a smaller domain of influence (524) within which the secondary effects cannot be feasibly neglected.

The initial domain of influence may be set to a nominal value based on previous experience, and thereafter a measure of influence is preferably used to determine the next domain of influence from the current system state. In some embodiments, the quantity of interest at the boundary of the current domain of influence is analyzed to determine a time derivative and spatial gradient. If these values, when combined with a time step, exceed a preset threshold, the domain of influence is expanded. The amount of expansion may be calculated or it may be determined iteratively, e.g., continuing the expansion until the measure of influence falls below the preset threshold. The measure of influence is expected to be dependent on the system being simulated, and may reflect a physical property, e.g., a temperature, a slope, a flow rate, or a deformation. The region outside the domain of influence is ignored when constructing the equations expressing the subsequent system state as a function of the current one.

The domain of influence need not always be adaptive. Although system responses to transients may be expected to have evolving domains of influence, there exist stead-state systems where the domain of influence may be stable. Thus, for example, in a waterfall simulation, the domain of influence may be confined to the area immediately adjacent to the fall.

Figure 6:
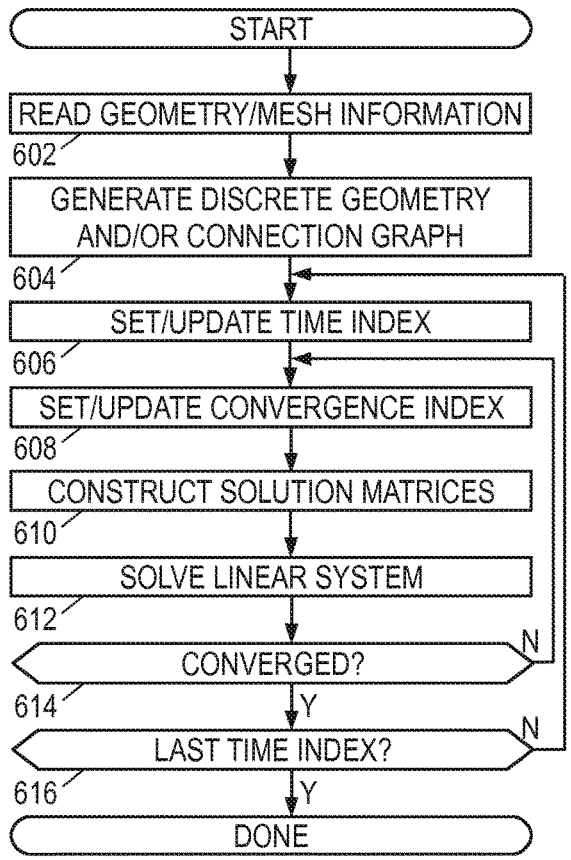
FIG. 6 is an illustrative simulation method that lacks an adaptive domain.

FIG. 6 is an illustrative simulation method that may be implemented by computing subsystem 110. The method begins in block 602 with the simulator module reading the information regarding the spatial properties of the region to be simulated, including formation layering, well positioning, fracture modeling, treatment planning, and any acquired measurements suitable for setting boundary conditions.

In block 604, the simulator module discretizes the volume and fracture geometry, using the results to construct a connection graph representing the relationships between the system elements. Depending on the model structure, the graph nodes may represent positions along the fluid flow paths, including the wellbore, the perforations, the fractures, junctions, formation blocks, and model boundaries, while the graph edges represent the interactions (multi-phase mass flows, heat flows, and forces) between the nodes. Other graph representations may alternatively be employed.

In block 606, a time index for a loop including blocks 606-616 is initialized or updated. Similarly, in block 608, a convergence index for a nested loop including blocks 608-614 is initialized or updated.

In block 610, the simulator module constructs a matrix equation, a linear system that implements the governing equations relating the subsequent state of the discretized system to the current state. Where the governing equations are nonlinear, the matrix implements a linearized approximation of the governing equations. The matrix equation has the form $$A x = b$$

where x is the vector of unknowns (the solution vector), b is a vector of known values (the constant vector), and A is the matrix relating the two (the model matrix). In high-complexity situations, the matrix A may turn out to be dense matrix and the resource cost is approximately on the order of $N^2$, or "$\approx O(N^2)$", where N is the number of unknowns.

In block 612, the simulator model solves the matrix equation. Using direct inversion to solve the matrix equation, this block would have a resource cost of $\approx O(N^3)$, though certain iterative solvers may reduce this cost to approach a lower bound of $O(N^2 \log N)$ for dense matrices. Even with sparse matrix solvers, the computational resource costs remain significant. Blocks 610 and 612 are both core operations that are performed many times during the simulation process.

In block 614, a convergence test is performed. If the solution agrees within preset tolerances to the previous state or previous iteration of the convergence loop, the solution is deemed to have converged. If, however, the change exceeds a given threshold, the solution is deemed to have not yet converged and blocks 608-614 are repeated using the intermediate solution as the current state. In block 616, a completion test is performed. If the last time index has not yet been reached, blocks 606-616 are repeated to determine the subsequent state of the system. At each time step, the system state may be stored in the model database 308 to permit analysis of the system's time evolution.

Figure 7:
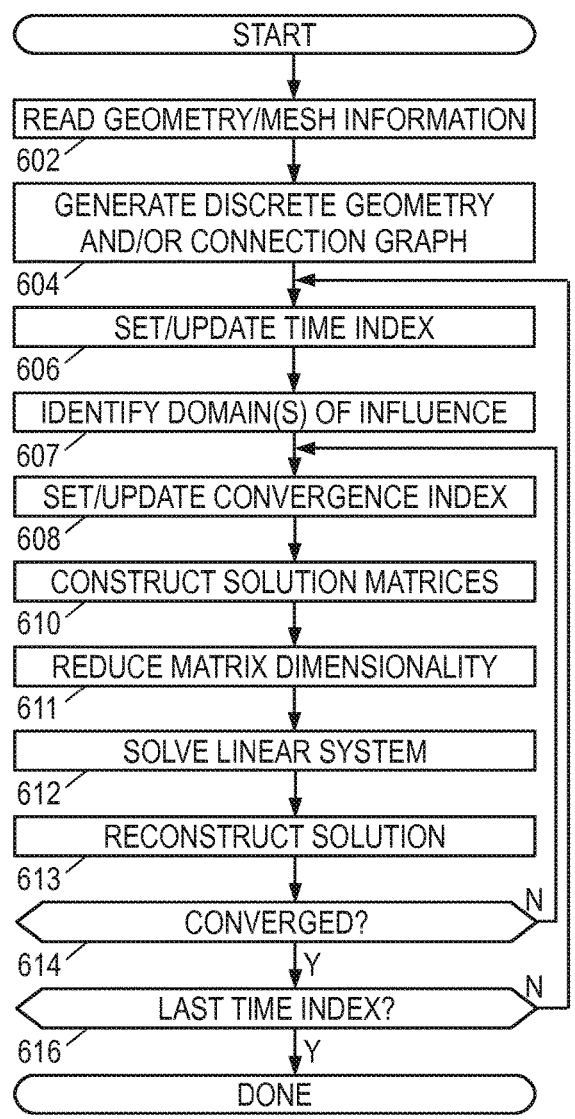
FIG. 7 is an illustrative simulation method that uses an adaptive domain.

As mentioned above, the computational resource requirements of blocks 610 and 612 depend strongly on N, the number of unknowns in the system of linear equations. In the illustrative simulation method of FIG. 7, the simulator module uses an adaptive domain technique to minimize N and thereby reduce the computational resource requirements. Even numbered blocks 602, 604, 606, 608, 610, 612, 614 and 616 are as described previously. After updating the time index in block 606, however, the simulator module determines the domains of influence in block 607. This "filtering" operation is a computational method that reduces the dimension (N) of the matrix A by retaining only important variables of the problem, for example by capturing the significant scales of the problem, while keeping the reduced matrix invertible. (Keeping the matrix invertible implies providing appropriate boundary conditions for the reduced problem.) As the disclosed techniques for determining the domain of influence require far fewer resources than would be expended in solving the larger matrix equations, a substantial computational resource savings can be achieved.

The domain-of-influence filter can be constructed based on several different considerations. For example, insight gained from prior attempts to solve the problem can be employed. Another consideration is the nature of the expected solution (e.g., the expected gradient of the solution). Yet another consideration may be the discrete governing equations (e.g., the size of the truncation error). Still other considerations may derive from an analysis of the model matrix itself. Regardless, the simulator module in block 610 constructs the solution matrices to exclude the peripheries around the identified domains of influence.

Some contemplated simulator modules employ multiple types of filters during different stages of the simulation method. Thus, in addition to the domain of influence filter implemented in blocks 607, 610, the simulator module may further operate on the solution matrices in block 611 with a second-level filter to further reduce their dimension N. For example, principal components decomposition may be applied to the solution matrices and the least significant components discarded. As another example, a static condensation (Guyan Reduction) procedure may be applied to the solution matrices, and the static portion omitted.

It is this smaller linear system that is solved in block 612. However, due to the operation in block 611, the simulator module must then in block 613 reconstruct the solution to the larger system from the smaller system solution. This operation may be implemented, for example, by simply assigning zero values to the variables deemed to be insignificant and mapping the variable index back from the reduced system to the original system.

An important property of the filters is that they are not needed to be exact. The filters can be approximations and often times may over-estimate the size of the reduced system to prevent violation of the boundary conditions. Where such violations might occur, an additional loop may be implemented to iteratively expand the domain of influence and repeat the calculations. Moreover, some simulator modules may employ the violation indicators to sharpen the reduced size bounds in a predictor-corrector manner.

Accordingly, among the embodiments disclosed herein are:

A: A domain adaptive simulation method that comprises: constructing a modeled domain of a system having a current state; determining a domain of influence within the modeled domain; generating a linear set of equations to derive a subsequent state of the system from the current state, the linear set of equations excluding a region of the modeled domain outside the domain of influence; deriving the subsequent state from the linear set of equations; and displaying the subsequent state or storing the subsequent state on a non-transitory computer-readable medium.

B: A domain-adaptive simulator that comprises: a data acquisition module that acquires measurements of a physical system; a simulator module that provides a series of states for the physical system, the series including at least a current state and a subsequent state, wherein as part of said providing, the simulator module implements a method that includes: (a) constructing a modeled domain for the system; (b) determining a domain of influence within the modeled domain; (c) generating a linear set of equations to derive the subsequent state from the current state, the linear set of equations excluding a region of the modeled domain outside the domain of influence; and (d) deriving the subsequent state from the linear set of equations; and a visualization module that displays the series of states.

Each of the embodiments A and B, may have one or more of the following additional features in any combination: (1) said determining a domain of influence is adapted based on the current state. (2) said determining a domain of influence accounts for a size of truncation error in discretized governing equations upon which the linear set of equations are based. (3) said determining a domain of influence includes: (a) using a predictor to make a prediction for a suitable domain of influence; (b) employing the prediction; (c) testing the subsequent state for a violation of boundary conditions; and (d) updating the predictor based on whether or not a violation occurred. (4) repeating said operations of determining, generating, and deriving with the subsequent state as the current state. (5) said repeating further includes iterating on said generating and deriving operations until convergence is achieved for the subsequent state. (6) said deriving includes: (a) reducing a dimensionality of the linear set of equations, (b) solving the reduced set of equations; and (c) reconstructing the subsequent state from the reduced set of equations. (7) said reducing includes performing a principal component decomposition and discarding at least a least significant component. (8) said reconstructing includes assigning zero values to variables discarded during the reducing operation, and mapping indices from the reduced set of equations to the original set of equations. (9) the system comprises compliant, inertial elements responding to a transient condition.

Numerous variations and modifications will become apparent to those skilled in the art once the above disclosure is fully appreciated. The ensuing claims are intended to cover such variations where applicable.

What is claimed is:

1. A domain adaptive simulation method for controlling an injection treatment that comprises:
   constructing a modeled domain of a system having a current state;
   determining a domain of influence which is expected to change within a time step of the domain adaptive simulation method within the modeled domain;
   generating a linear set of equations only for the domain of influence to derive a subsequent state of the modeled domain from the current state, the linear set of equations excluding a region of the modeled domain outside the domain of influence;
   deriving the subsequent state from the linear set of equations;
   displaying the subsequent state or storing the subsequent state on a non-transitory computer-readable medium; and
   controlling the injection treatment by modifying pressures, densities, and compositions of injection fluids used in the injection treatment based on the subsequent state of the modeled domain.

2. The method of claim 1, wherein said determining a domain of influence is adapted based on the current state.

3. The method of claim 2, wherein said determining a domain of influence accounts for a size of truncation error in discretized governing equations upon which the linear set of equations are based.

4. The method of claim 1, wherein said determining a domain of influence includes:
   using a predictor to make a prediction for a suitable domain of influence;
   employing the prediction;
   testing the subsequent state for a violation of boundary conditions; and
   updating the predictor based on whether or not a violation occurred.

5. The method of claim 1, further comprising:
   repeating said operations of determining, generating, and deriving with the subsequent state as the current state.

6. The method of claim 5, wherein said repeating further includes iterating on said generating and deriving operations until convergence is achieved for the subsequent state.

7. The method of claim 1, wherein said deriving includes:
   reducing a dimensionality of the linear set of equations,
   solving the reduced set of equations; and
   reconstructing the subsequent state from the reduced set of equations.

8. The method of claim 7, wherein said reducing includes performing a principal component decomposition and discarding at least a least significant component.

9. The method of claim 7, wherein said reconstructing includes assigning zero values to variables discarded during the reducing operation, and mapping indices from the reduced set of equations to the original set of equations.

10. The method of claim 1, wherein the system comprises compliant, inertial elements responding to a transient condition.

11. A domain-adaptive simulator for controlling an injection treatment that comprises:
   a data acquisition module that acquires measurements of a physical system;
   a simulator module that provides a series of states for the physical system, the series including at least a current state and a subsequent state, wherein as part of said providing, the simulator module implements a method that includes:
      constructing a modeled domain for the system;
      determining a domain of influence which is expected to change within a time step of the method within the modeled domain;
      generating a linear set of equations only for the domain of influence to derive the subsequent state the modeled domain from the current state, the linear set of equations excluding a region of the modeled domain outside the domain of influence; and
      deriving the subsequent state from the linear set of equations; and
   a visualization module that displays the series of states, wherein the injection treatment is controlled by modifying pressures, densities, and compositions of injection fluids used in the injection treatment based on the subsequent state of the modeled domain.

12. The simulator of claim 11, wherein as part of said determining, the simulator module adapts the domain of influence based on the current state.

13. The simulator of claim 12, wherein said as part of said determining, the simulator module accounts for a size of truncation error in discretized governing equations upon which the linear set of equations are based.

14. The simulator of claim 11, wherein as part of said determining, the simulator module performs a sequence of operations including:
   using a predictor to make a prediction for a suitable domain of influence;
   employing the prediction;
   testing the subsequent state for a violation of boundary conditions; and
   updating the predictor based on whether or not a violation occurred.

15. The simulator of claim 11, wherein the method implemented by the simulator module further comprises:
   repeating said operations of determining, generating, and deriving with the subsequent state as the current state.

16. The simulator of claim 15, wherein as part of said repeating, the method implements by the simulator module further includes iterating on said generating and deriving operations until convergence is achieved for the subsequent state.

17. The simulator of claim 11, wherein as part of said deriving, the method includes:
   reducing a dimensionality of the linear set of equations,
   solving the reduced set of equations; and
   reconstructing the subsequent state from the reduced set of equations.

18. The simulator of claim 17, wherein as part of said reducing, the method includes performing a principal component decomposition and discarding at least a least significant component.

19. The simulator of claim 17, wherein as part of said reconstructing the method includes assigning zero values to variables discarded during the reducing operation, and mapping indices from the reduced set of equations to the original set of equations.

20. The simulator of claim 11, wherein said physical system comprises compliant, inertial elements responding to a transient condition.

\* \* \* \* \*